United States Patent [19]

Dahl

[11] 4,162,284

[45] Jul. 24, 1979

[54] METHOD OF PRODUCING MECHANICALLY STRONG PELLETS FROM NON-OXIDIZABLE METAL OXIDES

[75] Inventor: Erik Q. Dahl, Vagsbygd, Norway

[73] Assignee: Elkem-Spigerverket A/S, Oslo, Norway

[21] Appl. No.: 775,696

[22] Filed: Mar. 9, 1977

Related U.S. Application Data

[63] Continuation of Ser. No. 610,135, Sep. 4, 1975, abandoned, which is a continuation-in-part of Ser. No. 453,319, Mar. 21, 1974, abandoned.

[51] Int. Cl.$^2$ ............................................. C04B 35/64
[52] U.S. Cl. .................................... 264/66; 264/56; 264/63; 264/DIG. 25
[58] Field of Search .................... 264/63, 66, 56, 117, 264/125, DIG. 25

[56] References Cited

U.S. PATENT DOCUMENTS

| | | | |
|---|---|---|---|
| 3,030,228 | 4/1962 | Hernandez et al. | 264/63 |
| 3,436,444 | 4/1969 | Von Tress | 264/66 |
| 3,814,789 | 6/1974 | Cox | 264/117 |

Primary Examiner—Robert F. White
Assistant Examiner—John A. Parrish
Attorney, Agent, or Firm—Eyre, Mann, Lucas & Just

[57] ABSTRACT

A method of producing mechanically strong sintered pellets suitable for consumable use in smelting furnaces from non-oxidizable metal oxides is disclosed. The metal oxide is combined with a carbon-containing material whereafter the formed pellet is sintered in a shaft furnace.

5 Claims, No Drawings

METHOD OF PRODUCING MECHANICALLY STRONG PELLETS FROM NON-OXIDIZABLE METAL OXIDES

This is a continuation, of application Ser. No. 610,135, filed Sept. 4, 1975, now abandoned, which is a continuation-in-part application of application Ser. No. 453,319 filed on Mar. 21, 1974, now abandoned.

The present invention relates to a method of producing mechanically strong pellets from non-oxidizable metal oxides. The metal oxides are combined with carbon and formed into pellets in known manner by the use of water and binders whereafter the pellets are dried and then sintered in a shaft furnace. The presence of the carbon in the pellets permits substantially uniform heating of the pellets to the temperature necessary for forming mechanically strong pellets and without requiring such high gas input temperatures that the shaft furnace is damaged.

The pellets of the present invention are consumably utilizable in smelting furnace operations. As is well known in the art, it is frequently desirable in smelting furnace operations to introduce non-oxidizable metal oxides for various purposes. For ease of handling, greatest efficiency and to prevent dusting problems and the like, it is highly desirable to be able to introduce these nonoxidizable metal oxide materials in pelletized form. However, because of the relatively rough handling of the pellets especially at the time of introduction and because of the high heat of the smelting furnace, it is quite desirable for the pellets to be mechanically strong so as to prevent especially the dusting problems referred to hereinbefore. As a result, the pellets are usually formed by sintering in an attempt to give them good mechanical strength. Even though the pellets are sintered, they are still consumably utilizable in smelting furnaces at normal smelting furnace temperatures, e.g., 1500° C. to 1800° C. and are thus distinguished from refractory materials which are not consumably utilizable in smelting furnace operations and quite contrarily will withstand smelting furnace temperatures.

It is frequently desirable to form pellets of nonoxidizable metal oxides such as hematite or chromium oxide or other metal oxides which cannot be further oxidized and there are many applications such as in smelting furnaces where it is necessary for the formed pellets to be mechanically strong. In order to be mechanically strong, however, it is necessary that all pellets be heated throughout to a high temperature and, for example, with chromium oxide this high temperature must be on the order of 1400–1500° C. However, such high temperatures are disadvantageous especially in a shaft furnace since the temperature of the gas introduced to the shaft furnace must be so high that the lining of the shaft furnace is in danger of being damaged. A further disadvantage of high temperatures is that it takes considerably more energy to produce them and, in these days of rising costs and dwindling supplies of combustible materials, this is a most serious disadvantage.

About the maximum temperature which standard shaft furnaces can sustain is 1400° C. When chromium oxide pellets are heated in such a shaft furnace with a gas at a temperature of 1400° C. supplied thereto, the pellets in the central part of the shaft furnace have a temperature of only about 1200° C. and this is not a high enough temperature to impart the necessary mechanical strength.

In addition to the disadvantage of low temperatures in the central part of the shaft furnace, there can also be local "hot" spots around the circumference of the shaft which can cause undesirable sintering together of the pellets into lumps.

The applicant has now discovered a method for evenly heating pellets of non-oxidizable metal oxides throughout the shaft furnace. In accordance with the present invention, there is combined with the non-oxidizable metal oxide during the pellet forming stage a quantity of fuel. The amount of fuel to be employed preferably has a combustion heat which corresponds to the heat of reaction by oxidation of magnetite to hematite, calculated on the basis of corresponding amounts of magnetite pellets. Suitable fuels for use in the present invention are carbon-containing materials such as coke, coal, pitch, etc. The amount of fuel to be added will generally be from about 0.5% to about 2.5% carbon based on the weight of the non-oxidizable metal oxide in the pellet.

In forming the pellets of the present invention by combining the non-oxidizable metal oxide with water and the carbon-containing material, there will usually be employed a binding material. Suitable binding materials include bentonite, molasses, sulfite lye, or other known binding materials. The particular binder employed is not a part of the present invention and the binder need only be sufficient to maintain the structural integrity of the pellets during the drying and burning processes. Depending on the carbonaceous material and the particular metal oxide, there may be some instances where no binder is necessary.

The amount of water to be added to form the pellets is not critical and need only be sufficient to form the pellets. The amount of water will necessarily vary depending upon the specific characteristics of the metal oxide and the binder. The amount of water should be sufficient to form cohering pellets but should not be so much that the resulting mass is in the nature of a liquid. With chromium oxide ore, it has been found that water in the amount of about 10–15% is acceptable.

Specific tests were conducted with chromium oxide ore pellets to demonstrate the improvement of the present invention. In each case pellets were formed from chromium oxide ore and water with 1% sulfite lye and 0.5% bentonite as binders based on the weight of the chromium oxide. In one case the pellets were provided with 1.5% carbon as coke while in the other case no carbon was used in the pellets. The formed pellets were dried and then were charged to a shaft furnace. The results of the tests are given in the Table on the next page.

TABLE

| Pellets type | Temperature °C. Circumference | Temperature °C. Central part | Average pressure strength kgs. per Pellet | Abrasion strength %>1 mm | Oil consumption kg/t | Capacity kg/h |
|---|---|---|---|---|---|---|
| Control | 1400 | 1220 | 120 | 66 | 21.4 | 1751 |
| Present | | | | | | |

TABLE-continued

| Pellets type | Temperature °C. Circumference | Temperature °C. Central part | Average pressure strength kgs. per Pellet | Abrasion strength %>1 mm | Oil consumption kg/t | Capacity kg/h |
| --- | --- | --- | --- | --- | --- | --- |
| Invention (With 1.5% coke) | 1300 | 1450 | 210 | 80 | 13.6 | 2187 |

As can be seen from the Table, the average pressure strength of the pellets measured in kilograms is more than 80% better when the pellets are made in accordance with the present invention. Furthermore, abrasion strength was increased by more than 20%. Abrasion strength is measured by rotating the pellets 5,000 revolutions in a ribbed drum and then measuring the amount of dust which passes through 1 mm. 1 mm is considered to be the minimum acceptable size of the fines. It must also be noted that the pellets formed in accordance with the present invention, while having a much higher pressure strength, also required less than 65% of the fuel oil necessary to heat the control pellets and furthermore, the capacity in kilograms per hour of the furnace was increased approximately 25% with the process according to the present invention.

It is thus seen that the process according to the present invention wherein the metal oxides are combined with carbonaceous material during formation of the pellets and before burning results in many advantages including greater pellet strength, greater abrasion strength, less oil consumption and greater throughput capacity.

It is pointed out that in the instant example the pellets in the central portion of the shaft furnace had temperatures somewhat higher than the pellet temperatures in the circumferential parts but it will be appreciated that the temperatures could be made the same by reducing the supply of carbon in the pellets and adjustment of the combustion air whereby a more even temperature distribution can be obtained.

It will be understood that the claims are intended to cover all changes and modifications of the preferred embodiments of the invention, herein chosen for the purpose of illustration, which do not constitute departures from the spirit and scope of the invention.

What is claimed is:

1. A process for the preparation of pellets from non-oxidizable metal oxides consumably utilizable in smelting processes from non-oxidizable metal oxides which pellets are for introduction into a smelting furnace during its operation comprising forming pellets from a composition consisting essentially of one or more non-oxidizable metal oxides consumably utilizable in smelting processes admixed with water and a carbon-containing material, the carbon-containing material being present in an amount of from at least about 0.5% carbon by weight to about 2.5% carbon by weight of non-oxidizable metal oxide, whereby the temperature of the pellets is maintained below the level at which undesirable sintering together of the pellets into lumps may result and thereafter sintering the pellets in a shaft furnace at a maximum shaft furnace temperature of approximately 1400° C. by supplying heat thereto and wherein the carbon-containing material supplies at least part of the heat for the sintering.

2. The process of claim 1 wherein the carbon-containing material is selected from the group consisting of coke, coal, pitch and combinations thereof.

3. The process of claim 1 wherein the non-oxidizable metal oxide is selected from the group consisting of chromium oxide and hematite.

4. A process for the preparation of pellets from non-oxidizable metal oxides consumably utilizable in smelting process employing temperatures in the range of about 1500° C. to about 1800° C. which pellets are for introduction into a smelting furnace during its operation comprising forming pellets from a composition consisting essentially of one or more non-oxidizable metal oxides from the group consisting of chromium oxide and hematite consumably utilizable in smelting processes admixed with water and a carbon-containing material, the carbon containing material being present in an amount of from about 0.5% carbon by weight to about 2.5% carbon by weight of non-oxidizable metal oxide, whereby the temperature of the pellets is maintained below the level at which undesirable sintering together of the pellets into lumps may result and thereafter sintering the pellets in a shaft furnace at a maximum shaft furnace temperature of approximately 1400° C. by supplying heat thereto and wherein the carbon-containing material supplies at least part of the heat for the sintering.

5. The process of claim 4, wherein the carbon-containing material is selected from the group consisting of coke, coal, pitch and combinations thereof.

* * * * *